United States Patent [19]

Cohen

[11] 4,200,712
[45] Apr. 29, 1980

[54] COATING POLYMERIZATION REACTORS WITH OLIGOMER COATINGS DERIVED FROM REACTION PRODUCTS OF SUBSTITUTED PHENOLS

[75] Inventor: Louis Cohen, Avon Lake, Ohio

[73] Assignee: The B. F. Goodrich Company, Akron, Ohio

[21] Appl. No.: 953,713

[22] Filed: Oct. 23, 1978

[51] Int. Cl.² .................. C08F 2/18; B05D 7/22; B05D 7/24
[52] U.S. Cl. .......................... 526/62; 422/241; 427/230; 427/236; 428/35; 526/344.2; 528/484
[58] Field of Search ........... 526/62, 344.2; 528/484; 422/241; 427/230, 236; 428/35

[56] References Cited

U.S. PATENT DOCUMENTS

| | | | |
|---|---|---|---|
| 3,778,423 | 12/1973 | Reiter | 526/62 |
| 4,068,059 | 1/1978 | Witenhafer | 526/62 |
| 4,076,951 | 2/1978 | Katayama et al. | 526/62 |
| 4,080,173 | 3/1978 | Cohen | 428/35 |
| 4,093,787 | 6/1978 | Burgess et al. | 526/344.2 |
| 4,098,972 | 7/1978 | Ogawa et al. | 528/484 |
| 4,105,840 | 8/1978 | Cohen | 526/62 |

Primary Examiner—William R. Dixon, Jr.
Attorney, Agent, or Firm—Roy P. Wymbs

[57] ABSTRACT

This invention relates to a polymerization reaction vessel having a coating on the inner surfaces thereof resulting from applying thereto a coating composition containing, as a primary ingredient, the reaction product or oligomers of (1) an alkyl or halogen substituted phenol, such as p-chlorophenol and the like, (2) a condensing agent, such as formaldehyde, and the like, and (3) a polyhydric phenol, such as resorcinol, and the like, dissolved in water or an aqueous alkaline solution. When polymerizing olefinic monomers, such as vinyl halides, vinylidene halides, and vinylidene monomers, having at least one terminal

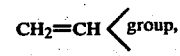

and mixtures thereof, polymer buildup on the inner surfaces of the reaction vessel is substantially eliminated. Further, multiple charges or batches of polymer can be made in said internally coated reaction vessel without opening the same between charges thus preventing the escape of unreacted monomer(s) to the surrounding atmosphere.

14 Claims, No Drawings

COATING POLYMERIZATION REACTORS WITH OLIGOMER COATINGS DERIVED FROM REACTION PRODUCTS OF SUBSTITUTED PHENOLS

BACKGROUND OF THE INVENTION

Various type chemical processes are commonly carried out in large, stirred vessels which are frequently provided with auxiliary equipment, such as baffles, agitator equipment, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or buildup, of solid polymer on reactor surfaces, not only interferes with heat transfer, but decreases productivity and adversely affects polymer quality.

The polymer buildup problem is particularly troublesome in the commercial production of polymers and copolymers of vinyl and vinylidene halides, when polymerized alone or with other vinylidene monomers having a terminal

or with polymerizable polyolefinic monomers. For example, when polymerizing vinyl chloride, and other comonomers when used, the same are maintained in the form of discrete droplets in an aqueous suspension system by the use of suspending agents and agitation. When the reaction is complete, the resultant polymer, or PVC, is washed and dried. However, these suspension systems are often unstable and during the polymerization reaction, vinyl chloride polymer builds up on the interior surfaces of the reactor, including the surfaces of the baffles and agitator. Obviously, this polymer buildup must be removed since it results in further formation of polymer buildup which in turn results in a crust that adversely affects heat transfer and contaminates the polymer being produced. While various methods have heretofore been proposed to reduce the amount and nature of polymer buildup on polymerization reactor surfaces, such as solvent cleaning, various hydraulic and mechanical reactor cleaners, and the like, none has proved to be the ultimate in polymer buildup removal. That is to say, these various methods and apparatus have done an acceptable job, but there is still room for improvement in this area, particularly from an economic point of view.

It has been proposed to coat the internal surfaces of the reactor with various polymer buildup resistant coating materials. For example, in U.S. Pat. Nos. 4,024,330 and 4,024,301, various polyaromatic amines are shown as useful for coating reactors to substantially eliminate buildup. Alkali soluble dyes have been shown to be useful for this purpose in U.S. Pat. No. 4,068,059. Further, in U.S. Pat. No. 4,080,173 there is shown and described the use of selfcondensed polyhydric phenols and polyhydric naphthols as useful coating materials to prevent polymer buildup. While all these coating materials give good to excellent results, the search continues for new and improved polymer buildup resistant materials with which to coat reactors for the purpose of preventing or eliminating polymer buildup on the inner surfaces thereof.

SUMMARY OF THE INVENTION

It has been found that if a polymerization reaction vessel, particularly one having inner surfaces of stainless steel, has been previously coated on said inner surfaces with the proper coating, undesirable buildup on said surfaces can be substantially decreased, and in many cases entirely eliminated, when polymerizing olefinic monomers therein. I have now found that when the interior surfaces of a polymerization reactor are coated with an aqueous or aqueous alkaline coating solution containing, as a primary ingredient, the reaction product or oligomers of (1) alkyl or halogen substituted phenol, such as p-chlorophenol, and the like, (2) a condensing agent, such as formaldehyde, and the like, and (3) a polyhydric phenol undesirable buildup on said interior surfaces of the reactor is substantially eliminated. Due to the nature of the coating solution or composition, it can be applied to the inner surfaces of the reactor without opening the same, thus providing a closed polymerization system. By use of the present coating composition, the necessary surface tension ($\gamma_c$) for wetting of a solid surface by the water phase of the polymerization medium is obtained. In polymerizing the monomers in such a coated polymerization vessel or reactor, the same is done in an aqueous polymerization medium which is kept in contact with said coated surfaces throughout the polymerization reaction.

DETAILED DESCRIPTION

In accordance with the present invention, a film or coating of a coating material, made by the reaction of an alkyl or halogen substituted phenol, a condensing agent and a polyhydric phenol, is applied to the inner surfaces of a polymerization reactor or vessel by merely contacting said surfaces with an aqueous solution or an aqueous alkaline solution of said coating material. All exposed surfaces in the interior of the reactor, such as the baffles, agitator or mixing mechanism, etc., are likewise coated in the same manner. After the coating solution has been applied to the inner surfaces of the reactor, the polymerization medium can be introduced to the reactor and the reaction started without the necessity of drying said surfaces beforehand. However, it is preferred, when after the application of the coating solution to the inner surfaces, that the surfaces are rinsed with water, such as by spraying, thereby, surprisingly, leaving on said surfaces a tightly adhering coating or film of the coating material which is not affected by the polymerization medium even though vigorously agitated during the polymerization reaction.

The coating materials useful in the practice of the present invention have the following general structure:

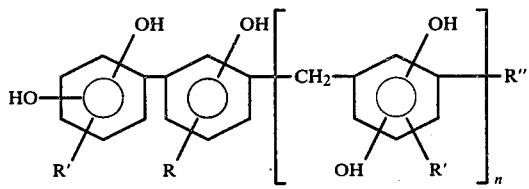

wherein R is halogen or an alkyl group containing from 1 to 4 carbon atoms and R' is H, OH, halogen, or an alkyl group containing from 1 to 4 carbon atoms, R" is H or —CH₂OH, and n is an integer from 1 to 20.

Among the materials that may be employed in making the reaction products suitable as coating materials in the present invention are the halogen or alkyl substituted phenols, such as p-chlorophenol, p-cresol, p-ethyl phenol, etc.; the condensing agents, such as formaldehyde, acetaldehyde, etc.; and polyhydric phenols, such as resorcinol, hydroquinone, catechlor, phloroglucinol, etc. A good example of a coating material having the above general structure is that formed by the reaction of p-chlorophenol, formaldehyde and resorcinol. This material, or reaction product, is obtained in accordance with the following reaction:

1. In aqueous solution, p-chlorophenol is reacted with formaldehyde to form a bis-hydroxymethyl chlorophenol as follows:

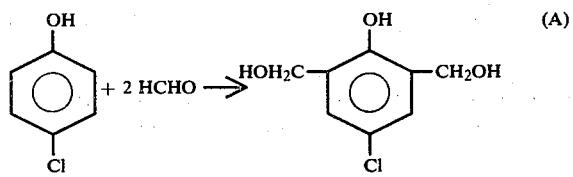

2. Without isolating compound (A), and still in aqueous solution, (A) is reacted with resorcinol giving precipitation of 3,4,5, etc. ring oligomers in accordance with the following equation showing the trimer (B) plus higher oligomers:

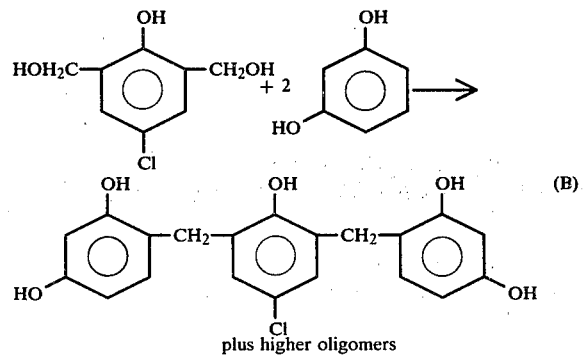

plus higher oligomers

The second reaction can also be carried out by fusion giving higher average molecular weight. A similar coating material can be made by substituting p-cresol for p-chlorophenol in step 1. above.

The material (B) above, is available under the trademark "Pexul" which is made and sold by I.C.I., Ltd. of Great Britain Pexul is supplied by I.C.I. as a 20% solution dissolved in 3 normal NH₄OH, that is, as the ammonium salt at a pH of approximately 10. The historical development of Pexul is described in an article entitled "Development of a Polyester-Rubber Adhesive" which is found in British Polymer Journal, 1971, Vol. 3, March, pages 58-62. In this article the author points out that with careful attention to reaction conditions and stoichiometry a consistent product can be obtained, but the product always consists of a mixture of compounds or oligomers. However, the author further points out that it is possible to crystallize from an aqueous solution of the product of the above reaction a material which is identified by analysis as the trimer, or product (B) above.

In order to prevent polymer buildup in a polymerization reactor, it is essential that the inner surfaces thereof are water-wettable. An ordinary solid surface, such as stainless steel, is not water-wettable due to the normal contamination of said surface with organic materials through contact with the atmosphere. The surface can be cleaned, such as with chromic acid, or an abrasive cleanser, for example, and it will become water-wettable. However, such cleaning alone does not solve the problem since the surface will not remain clean for a sufficient length of time, that is, for more than the duration of a single polymerization reaction. This necessitates recleaning the surface after each polymerization cycle. Therefore, applying a coating to the surface which will be water-wettable and resist polymer buildup thereon and remain on said surface throughout multiple reaction cycles is most desirable.

When a metal or solid surface is non-wettable, a liquid thereon, such as water, will form droplets and not flow out into a smooth film. The angle formed between the tangent of the side of the droplet and the metal or glass surface is called the "contact angle" and is referred to as "theta" ($\theta$). A further measurement of the wettability of a solid surface is the critical surface tension for wetting a solid surface and is expressed as "$\gamma_c$". The $\gamma_c$ is measured in dynes per centimeter. Using water as the standard, in order for a solid surface to be wettable, $\theta$ must equal zero or be very close to it, and $\gamma_c$ must be 72 dynes/cm. or greater.

More importantly, the material being applied to the surface should not only form a wettable surface, but also form a layer or film thereon which is not readily removable. This film adheres to the solid or metal surface by adsorption and in many cases, the film is a monolayer of the coating material applied which is of the order of a molecule in thickness. These films of such thickness are invisible to the naked eye thus eliminating any color problem, such as is the problem with many coatings heretofore used for the same purpose. Of course, films of greater thickness can result when using higher solids content coating solutions, in accordance with the present invention, which films or coatings are visible to the naked eye. The film or layer formed by the coating solution is not removable by washing with water. That is to say, the coating or film is resistant to removal from the surfaces when a turbulent aqueous reaction medium is in contact therewith, caused by the agitation of the polymerization mixture in the reactor.

The coating solutions of the present invention are made by conventional methods, using heat and agitation where necessary. In making said solutions, usually a temperature in the range of about 0° C. to about 100° C. is satisfactory. Agitation during dissolution is desirable. As previously pointed out, the coating material is dissolved in water or an aqueous alkaline solution. It has been found that a concentration of coating material in the range of about 0.05% to about 3.0% by weight is satisfactory in accomplishing the objectives of the present invention and the coating solutions so produced are only slightly colored. To insure against undesirable color, and for economic reasons, it is preferred to employ a concentration of coating material in said solutions in the range of 0.05% to 0.20% by weight. It is to be understood that since the molecular weight of the coating material affects the total solids content in the coating solution, the concentration of said material could, in certain instances, be greater than 3.0% or less than 0.05% by weight.

The coating solutions of the instant invention having a pH in the range of about 7.0 to about 13 are satisfactory. It is preferred, however, to operate at a pH in the range of 7.5 to 9.5. The pH is affected by the kind and number of substituent groups attached to the aromatic nuclei of the coating material, and the cation used to form the salt, such as Na, K, $NH_4$ and the like.

As previously pointed out, the coating solution is usually applied to the inner reactor surfaces by spraying. However, it is also possible to apply the coating solution by flooding the reactor and then draining, or painting or brushing on, but spraying is the most practical and economical method of application. After spraying the coating solution on the inner surfaces and draining the reactor, the polymerization reaction can be started immediately without further treatment of said surfaces. However, it has been found that excellent results are obtained when after applying the coating solution to the inner surfaces of the reactor, the coated surfaces are sprayed with water and the reactor drained prior to charging the reactor with the polymerization mixture or recipe. It should also be pointed out that the coatings defined herein work equally well on glass or metal surfaces, such as stainless steel, and the like.

One important aspect of the present invention is that multiple polymerizations may be run without opening the reactor between charges since, with the spray nozzle or nozzles mounted at strategic points on the reactor, it is possible to reach all inner surfaces thereof while the reactor is closed. Although multiple charges may be run in a coated reactor without recoating the surfaces, it has been found to be expeditious, and preferred, to recoat the internal surfaces of the reactor periodically after several charges have been run therein, or after each charge, to insure uniform and efficient production. When it is decided to recoat the reactor, the reactor is drained, and the inner surfaces of the reactor are flushed with water. The coating solution is applied to the surfaces, preferably by spraying, and the reactor is drained of the excess coating solution in such a way that the same can be sent to a recovery system, if desired. Then, optionally, the surfaces having the coating thereon are sprayed with water and the effluent is discarded, or recovered if desired. Thereafter, the reactor is charged with the polymerization medium and ingredients in the usual manner and the reaction commenced immediately with no particular modification of processing techniques being required due to the presence of the coating. It is understood, of course, that one can recoat the reactor as often as desired without opening the same, even after every charge is polymerized. Further, utilization of the internally coated reaction vessel of the present invention does not adversely affect the heat stability or other physical and chemical properties of the polymers produced therein.

While the present invention is specifically illustrated with regard to the suspension polymerization of vinyl chloride, it is to be understood that the process and apparatus may likewise be applied in the dispersion, emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $$CH_2=C\diagdown \text{ grouping,}$$

such as esters of acrylic acid for example methyl acrylate, ethyl acrylate, butyl acrylate, octyl acrylate, cyanoethyl acrylate, and the like; vinyl acetate; acrylonitrile; esters of methacrylic acid, such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal $$CH_2=C\diagdown \text{ grouping}$$

copolymerizable therewith in amounts as great as about 80% or more by weight, based on the weight of the monomer mixture, since polymer buildup in the reaction vessel is a bad problem here.

The polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures, polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

In order to rate the various coatings, as particularly set forth in the specific examples which follow hereinafter, there has been devised a rating scale with respect to "paper" and "sandy" buildup. An uncoated reactor referred to as the control, where normal amounts of both types of buildup occur, is given a rating of 1.5. Any rating below 1.0 is good or a definite improvement. In other words, 0.0 rating is perfect, and so on.

In order to further illustrate the present invention, the following specific examples are given. It is to be understood, however, that this is merely intended in an illustrative and not limitative sense. In the examples, all parts and percents are by weight unless otherwise indicated.

EXAMPLE I

In this example, the coating material employed was the reaction product of p-chlorophenol, formaldehyde, and resorcinol which product was made as set out hereinbefore. The reaction product was then dissolved in 3 N NH4OH, that is, as the ammonium salt, to give a 20% solution having a pH of 10. This solution is referred to as the concentrate. Sufficient of the concentrate was then mixed with demineralized water and the pH was adjusted to 7.6 to give a 0.10% reaction product coating solution. Thereafter, the inner surfaces of the polymerization reactor, which had been previously cleaned with Ajax, were coated with said coating solution by spraying and the coating rinsed with water. The coating had a $\gamma_c$ greater than 72 dynes/cm. Thereafter, the following recipe was charged to the coated reactor:

| | |
|---|---|
| Vinyl chloride | 1000 grams |
| Water (demineralized) | 2055 grams |
| 88% hydrolyzed polyvinyl acetate | 0.5 gram |
| di-secondary butyl peroxydicarbonate | 0.5 cc. |

A full reactor technique was used in the polymerization, sufficient water being added to keep the reactor full throughout the reaction cycle. The temperature of the reaction was maintained at 57° C. and the reaction medium was agitated. The water was added during the reaction as the mixture shrank because of formation of polymer. Upon the addition of 400 grams of water, the reaction was discontinued. After removal of the contents of the reactor, in usual fashion, the internal surfaces were rinsed with water, then recoated and rinsed with water and a second charge made and polymerized in the same manner as above. After the second charge was polymerized, the reactor was recoated and a third was polymerized, all as was done before. Upon completion of the third charge, the internal surfaces of the reactor were classified in accordance with the aforementioned procedure for rating said surfaces. The results were as follows:

| BUILDUP | CONTROL (NO COATING) | FIRST CHARGE | SECOND CHARGE | THIRD CHARGE |
|---|---|---|---|---|
| Paper | 1.5 | 0.2 | 0.0 | 0.0 |
| Sandy | 1.5 | 0.0 | 0.5 | 0.5 |

The superior results of the coated reactor over the uncoated reactor are evident from the above data. Substitution of p-cresol for p-chlorophenol in making the reaction product for the coating will give like beneficial results.

EXAMPLE II

In this example the same recipe and procedure described in Example I was used, except that a 5 gal. solution of the reaction product (20% in NH4OH) was diluted 200/1 with demineralized water. This gave a coating solution of 0.10% with a pH of 9.35. Three charges were run in the reactor and the internal surfaces were classified after each charge with the following results.

| BUILDUP | CONTROL (NO COATING) | FIRST CHARGE | SECOND CHARGE | THIRD CHARGE |
|---|---|---|---|---|
| Paper | 1.5 | 0.3 | 0.7 | 0.7 |
| Sandy | 1.5 | 0.0 | 0.0 | 0.0 |

Again, the superior results of the coated reactor are apparent from the above data.

One of the principal advantages of the present invention is that in using the invention, polymer buildup on the inner surfaces of the polymerization reactor is substantially reduced, and in many cases, practically eliminated. This results in increased production over a unit period of time. More importantly, the present invention enables one to operate a closed polymerization system, which, in the case of vinyl chloride polymerization, has the advantage of reducing drastically the parts per million of vinyl chloride in the atmosphere of the plant. Such reduction in vinyl chloride in the atmosphere is extremely helpful in meeting recent Governmental requirements. Numerous other advantages of the present invention will be apparent to those skilled in the art.

While the present invention has been described cations and equivalents will be apparent to those skilled in the art and are intended to be included within the scope of the present invention, which is to be limited only by the scope of the appended claims.

I claim:

1. A process for substantially eliminating the buildup of polymers on the internal surfaces of a polymerization reaction vessel which comprises applying to said surfaces an aqueous coating solution containing an oligomer having the general structure

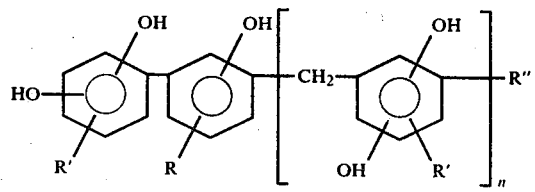

wherein R is halogen or an alkyl group containing from 1 to 4 carbon atoms and R' is selected from the group consisting of H, OH, halogen and an alkyl group containing from 1 to 4 carbon atoms, R" is selected from the group consisting of H and —CH2OH, and wherein n is an integer from 1 to 20, and conducting the polymerization of monomer(s) while in contact with the coated internal surfaces of said vessel.

2. A process as defined in claim 1 wherein the monomer is vinyl chloride.

3. A process as defined in claim 1 wherein the oligomer is formed by the reaction of a halogen or alkyl substituted phenol, a condensing agent, and a polyhydric phenol.

4. A process as defined in claim 1 wherein the coating solution contains from about 0.05% to about 3.0% by weight of the oligomer.

5. A process as defined in claim 1 wherein the coated internal surfaces are rinsed with water prior to conducting the polymerization of monomer(s).

6. A process as defined in claim 1 wherein the coating solution has a pH in the range of about 7.5 to about 9.5.

7. A process as defined in claim 3 wherein the halogen or alkyl substituted phenol is p-chlorophenol.

8. A process as defined in claim 3 wherein the halogen or alkyl substituted phenol is p-cresol.

9. A process as defined in claim 3 wherein the condensing agent is formaldehyde.

10. A process as defined in claim 3 wherein the polyhydric phenol is resorcinol.

11. A process as defined in claim 1 wherein the oligomer is the reaction product of p-chlorophenol, formaldehyde and resorcinol.

12. A polymerization reaction vessel having on all the internal surfaces thereof a coating comprised of an oligomer having the general structure

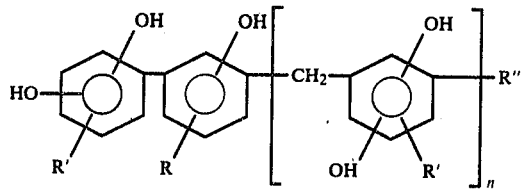

wherein R is halogen or an alkyl group containing from 1 to 4 carbon atoms and R' is selected from the group consisting of H, OH, halogen, an alkyl group containing from 1 to 4 carbon atoms, R" is selected from the group consisting of H and —CH$_2$OH, and wherein n is an integer from 1 to 20.

13. A polymerization reaction vessel as defined in claim 12 wherein the oligomer is the reaction product of p-chlorophenol, formaldehyde and resorcinol.

14. A polymerization reaction vessel as defined in claim 12 wherein the coated surfaces are characterized by having a critical surface tension of at least 72 dynes/centimeter and a contact angle with water of about zero.

* * * * *

UNITED STATES PATENT AND TRADEMARK OFFICE
CERTIFICATE OF CORRECTION

PATENT NO. : 4200712
DATED : April 29, 1980
INVENTOR(S) : Louis Cohen

It is certified that error appears in the above-identified patent and that said Letters Patent are hereby corrected as shown below:

Column 3 of the first formula should read as follows:

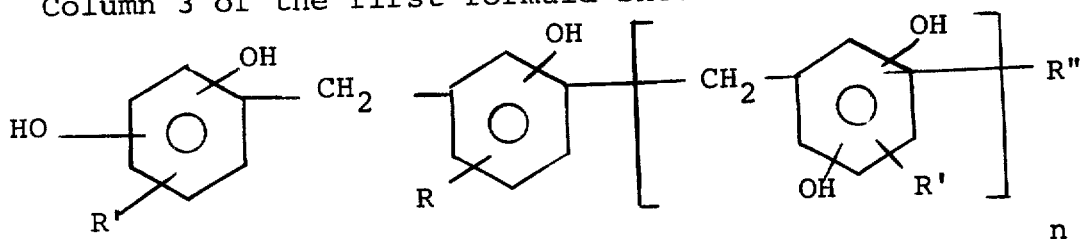

Column 8, Claim 1 the formula should read as follows:

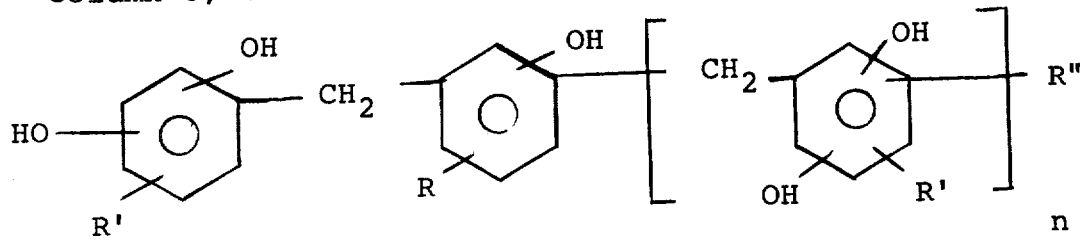

UNITED STATES PATENT AND TRADEMARK OFFICE
CERTIFICATE OF CORRECTION

PATENT NO. : 4200712
DATED : April 28, 1980
INVENTOR(S) : Louis Cohen

It is certified that error appears in the above-identified patent and that said Letters Patent are hereby corrected as shown below:

Column 10, Claim 12 the formula should read as follows:

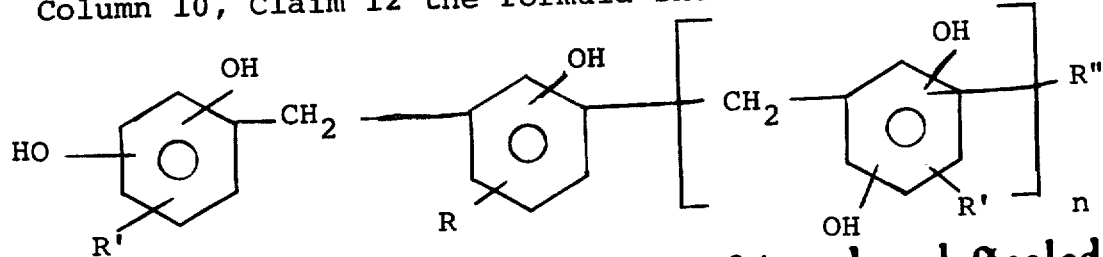

Signed and Sealed this

Fifth Day of August 1980

[SEAL]

Attest:

SIDNEY A. DIAMOND

Attesting Officer

Commissioner of Patents and Trademarks